United States Patent [19]

Tajima et al.

[11] 4,410,670

[45] Oct. 18, 1983

[54] PROCESS FOR PREPARING POLYOLEFINS

[75] Inventors: Yoshio Tajima, Tokyo; Kazuo Matsuura, Kawasaki; Nobuyuki Kuroda, Yokohama; Mituji Miyoshi, Kanagawa, all of Japan

[73] Assignee: Nippon Oil Company, Limited, Tokyo, Japan

[21] Appl. No.: 45,961

[22] Filed: Jun. 6, 1979

[30] Foreign Application Priority Data

Jun. 13, 1978 [JP] Japan ................................ 53-70366
Jun. 13, 1978 [JP] Japan ................................ 53-70367

[51] Int. Cl.$^3$ ............................................ C08F 4/66
[52] U.S. Cl. .................................. 526/114; 502/102; 502/105; 502/127; 526/124
[58] Field of Search ............................ 526/124, 114

[56] References Cited

U.S. PATENT DOCUMENTS

| | | | |
|---|---|---|---|
| 4,061,857 | 12/1977 | Kuroda | 526/114 |
| 4,081,589 | 3/1978 | Peters | 526/97 |
| 4,083,802 | 4/1978 | Matsuura | 252/429 |
| 4,087,380 | 5/1978 | Hyde | 252/429 B |
| 4,103,078 | 7/1978 | Sato | 526/124 |
| 4,128,502 | 12/1978 | Kildahl | 252/431 R |

*Primary Examiner*—C. A. Henderson
*Attorney, Agent, or Firm*—Wyatt, Gerber, Shoup, Scobey & Badie

[57] ABSTRACT

This invention provides a process for preparing polyolefins using a new catalyst. According to this invention, α-olefins can be polymerized or copolymerized to have good stereoregularity and at a high activity by the use of such new catalyst. The new catalyst used in this invention consists of [A] a solid component obtained by contacting (1) a magnesium oxide, (2) an aluminum trihalide, (3) a hydroxy compound represented by the general formula ROH wherein R is an organic radical having 1 to 20 carbon atoms and (4) a titanium halide and/or an addition product of a titanium halide and an aromatic carboxylic acid ester, and [B] an organometallic compound and/or an addition product of an organometallic compound and an aromatic carboxylic acid ester; or it consists of the solid component of the above [A], the organometallic compound and/or the addition product of an organometallic compound and an aromatic carboxylic acid ester of the above [B], and [C] an aromatic carboxylic acid ester. The said catalyst is prepared, in one of the most preferred embodiments thereof, by using the solid component of the above [A] which is obtained by first co-pulverizing the compounds of the above (1),(2) and (3), then washing the co-pulverized product with an aromatic compound, separating the liquid phase to give a solid substance (a) and contacting the latter with the compound and/or the addition product of the above (4).

17 Claims, No Drawings

PROCESS FOR PREPARING POLYOLEFINS

BACKGROUND OF THE INVENTION

1. Field of the Invention

This invention relates to the polymerization or copolymerization of olefins using a new catalyst. More particularly, it is concerned with a process for preparing polyolefins characterized by polymerizing or copolymerizing α-olefins in high stereoregularity using a new catalyst with carrier of high performance.

2. Description of the Prior Art

As a high stereoregular polymerization catalyst for α-olefins there has been known a catalyst consisting of a titanium halide and an organoaluminum compound. In polymerization using such catalyst system, however, a high stereoregular polymer is obtained, but the yield per titanium component is still insufficient and it is necessary to add a step for removing the residual catalyst in the resulting polymer. To solve this technical problem, there have recently been proposed some high-performance catalysts with a magnesium halide as carrier (see, for example, Japanese Patent Laying Open Prints Nos. 16986/73, 16987/73 and 16988/73).

It is desirable, however, that the polymerization activity as well as the stereoregularity be as high as possible and that the properties of the powder of the resulting polymer be good.

SUMMARY OF THE INVENTION

This invention relates to a process for preparing high stereoregular polyolefins in extremely high activity using a new catalyst system. Polymers prepared according to this invention have a high bulk density and superior powder properties. In addition, as compared with catalyst systems using magnesium chloride as carrier, the halogen content in the polymer is low and there is no fear of polymer in-stability due to contamination with halogen nor is there fear of corrosion of equipments. According to this invention, moreover, the catalyst removing step can be omitted in the process for preparing polyolefins, and the resulting polymers contain only a very small proportion of atactic part. Thanks to these features, this invention provides a very economical process for preparing polyolefins.

DESCRIPTION OF THE INVENTION

This invention, according to one aspect thereof, relates to a process for polymerizing or copolymerizing olefins using a catalyst, which catalyst consists of [A] a solid component obtained by contacting (1) a magnesium oxide, (2) an aluminum trihalide, (3) a hydroxy compound represented by the general formula ROH wherein R is an organic radical having 1 to 20 carbon atoms and (4) a titanium halide and/or an addition product of a titanium halide and an aromatic carboxylic acid ester, and [B] an organometallic compound and/or an addition product of an organometallic compound and an aromatic carboxylic acid ester, or which catalyst consists of the above components [A] and [B] plus [C] an aromatic carboxylic acid ester.

This invention, according to a further preferred aspect thereof, relates to a process for polymerizing or copolymerizing olefins using a catalyst, which catalyst consists of [A] a solid component obtained by contacting a solid substance (a), the solid substance (a) being prepared by co-pulverizing (1) a magnesium oxide, (2) an aluminum trihalide and (3) a hydroxy compound represented by the general formula ROH wherein R is an organic radical having 1 to 20 carbon atoms, when washing the co-pulverized product with an aromatic compound followed by separation of the liquid phase, with (4) a titanium halide and/or an addition product of a titanium halide and an aromatic carboxylic acid ester, and [B] an organometallic compound and/or an addition product of an organometallic compound and an aromatic carboxylic acid ester, or which catalyst consists of the above components [A] and [B] plus [C] an aromatic carboxylic acid ester.

It is unexpected to find that polyolefins of high stereoregularity can be prepared in high activity using the new catalyst system of this invention.

According to one aspect of this invention, moreover, the solid component [A] used in this invention may be prepared by any of the following methods:

(i) Magnesium oxide as component (1), aluminum trihalide as component (2), hydroxy compound represented by the general formula ROH as component (3), and titanium halide and/or addition product of titanium halide and aromatic carboxylic acid ester as component (4), are pulverized together.

(ii) First, components (1), (2) and (3) are pulverized together, then component (4) is added, followed by co-pulverization.

(iii) After co-pulverization of components (1), (2) and (3), the component (4) is contacted therewith in the liquid or gaseous phase.

(iv) The component (4) is further contacted in the liquid phase with the product obtained according to the above method (i) or (ii).

In the above solid component preparing methods (ii) and (iii), a solid carrier is first prepared by co-pulverization of the components (1), (2) and (3). In this case, the order of addition of the components (1)–(3) is not specially limited.

In the above method (iii) or (iv) and in the case of contacting the component (4) in liquid phase, a liquid titanium halide may be contacted as it is, or in an inert solvent such as hexane or heptane, at a reaction temperature of 0° to 150° C., then the solid component is separated and washed with an inert solvent, and it may be used as the solid component in this invention.

According to a further preferred aspect of this invention, solid component [A] to be used in this invention may be prepared in the following manner.

First, a magnesium oxide (1), an aluminum trihalide (2) and a hydroxy compound of the general formula ROH (3) are co-pulverized together. The order of addition of these components is optional.

Then, the product resulting from the above co-pulverization is washed with an aromatic compound. The liquid phase is separated, and the resulting solid substance (a) dried.

The solid substance (a) thus obtained is contacted with component (4), namely a titanium halide and/or an addition product of a titanium halide and an aromatic carboxylic acid ester, whereby the solid component of this invention is prepared.

The solid substance (a) and a titanium halide and/or an addition product of a titanium halide and an aromatic carboxylic acid ester of the component (4) may be contacted together in accordance with known procedures. For example, a liquid titanium compound is contacted alone, or in an inert solvent such as hexane or heptane, at a reaction temperature of 0° to 150° C., and the product thus obtained is used directly or after washing with an inert solvent as necessary, whereby the solid component to be used in this invention can be prepared. It is also preferable to contact the components by co-pulverizing. The said aromatic compound used for washing should be liquid under the treating condition, examples of which are benzene, toluene, xylene, alkyl-substituted aromatic compounds such as ethylbenzene and isopropylbenzene, halogen-substituted aromatic compounds such as chlorobenzene and dichlorobenzene. The washing temperature with an aromatic compound is not specifically limited, but is usually in the range of from 0° to 200° C. and preferably from 15° to 150° C. The ratio between the co-pulverized product and the aromatic compound used for washing is not specifically limited, either, but usually the washing is conducted once to several times using 1 to 100 grams of an aromatic compound per gram of the co-pulverized product. After washing, the aromatic compound which has been used as solvent is distilled off under atmospheric or reduced pressure, followed by drying to give a solid substance (a).

In preparing the solid component [A] to be used in this invention, the ingredients thereof may be contacted in the absence of an aromatic carboxylic acid ester, but the same operation in the presence of the ester is preferred.

In case an aromatic carboxylic acid ester is used, the preferred is not more than 5 mols, most preferably not more than 1 mol per mol of solid carrier (based on magnesium atom).

The aromatic carboxylic acid ester used in the aforesaid solid catalyst component preparation and the one used as the addition product of the component (4) may be same or different, and two or more thereof may be used together.

In preparing the solid component to be used in this invention, the aluminum trihalide component (2) is used in an amount of 0.001 to 10 mols and preferably 0.01 to 5 mols, and the hydroxy compound component (3) represented by the general formula ROH is used in an amount of 0.001 to 5 mols and preferably 0.01 to 1 mol, both per mol of the magnesium oxide component (1).

The amount of the component (4), namely a titanium halide and/or an addition product of a titanium halide and an aromatic carboxylic acid ester, is preferably adjusted so that the titanium content of the resulting solid component is in the range of from 0.5 to 10% by weight. The range of 1 to 8% by weight is specially desirable in order to attain a well-balanced activity per titanium and that per solid.

There is no specific limitation on the apparatus which can be used for co-pulverization, but usually a ball mill, a vibration mill, a rod mill or an impact mill are used. The conditions for co-pulverization such as the pulverization temperature and time can be easily decided by those skilled in the art according to the pulverizing method. The generally adopted range of pulverization temperatures is from 0° to 50° C. and pulverization time is from 0.5 to 50 hours, preferably from 1 to 30 hours.

This invention is further concerned with a process for polymerizing or copolymerizing olefins using a catalyst, which is [A] a solid component obtained by contacting (1) a magnesium oxide, (2) an aluminum halide, (3) a hydroxy compound represented by the general formula ROH wherein R is an organic radical having 1 to 20 carbon atoms and (4) a titanium halide and/or an addition product of a titanium halide and an aromatic carboxylic acid ester, [B] an organometallic compound and/or an addition product of an organometallic compound and an aromatic carboxylic acid ester, and further [C] an aromatic carboxylic acid ester. In this case, the amount of the aromatic carboxylic acid ester of the component [C] may be selected so that the aromatic carboxylic acid ester/organometallic compound molar ratio is not higher than 1.5, for example, in the range of from 0.05 to 1.5 and preferably from 0.1 to 0.7.

The aromatic carboxylic acid esters used in the components [A], [B] and [C] may be same or different.

The kind of the magnesium oxide component (1) to be used in this invention is not limited. Those available commercially may be used as is or after calcination as necessary.

As the aluminum trihalide component (2) there may be used aluminum chloride, aluminum bromide and aluminum iodide, among which aluminum chloride is specially desirable.

As the hydroxy compound component (3) represented by the general formula ROH wherein R is an organic radical of $C_1$ to $C_{20}$ there may be used one or more compounds selected from the group consisting of mono- or polyvalent aliphatic, alicyclic and aromatic alcohols and phenols. Examples are alcohols such as methanol, ethanol, n-propanol, n-butanol, hexanol, cyclohexanol, 2,6-dimethylhexanol, menthol, benzyl alcohol, phenethyl alcohol and cumyl alcohol; phenols such as phenol, cresol, xylenol, butylphenol, octylphenol, nonylphenol, dibutylphenol, naphthol, cumylphenol and chlorophenol; polyols such as ethylene glycol, propylene glycol and resorcinol, and various substituted derivaties thereof.

Titanium halides used as component (4) in this invention are not specifically limited. Preferable tetravalent titanium halides are the compounds represented by the general formula $Ti(OR)_n X_{4-n}$ wherein R is an alkyl, aryl or aralkyl group having 1 to 20 carbon atoms, preferably 1 to 8 carbon atoms, X is halogen atom and n is a whole number of from 0 to 3. Examples of the tetravalent halides are titanium tetrachloride, titanium tetrabromide, titanium tetraiodide, monoethoxytrichlorotitanium, diethoxydichlorotitanium, triethoxymonochlorotitanium, monoisopropoxytrichlorotitanium, diisopropoxydichlorotitanium, the reaction product of silicon tetrachloride and titanium alkoxide, and mixtures thereof. Trivalent titanium halides which may be used in this invention are not specially limited, examples of which are various titanium trihalides obtained by reducing titanium tetrahalides with hydrogen, aluminum, titanium or organometallic compounds, as well as compounds obtained by reducing various tetravalent alkoxytitanium halides with organometallic compounds. Specially, tetravalent titanium halides are preferably used in this invention.

The addition products of titanium halides and aromatic carboxylic acid esters which may be used in this invention are those of the foregoing titanium halides and the foregoing aromatic carboxylic acid esters, for example, those with a mol ratio of aromatic carboxylic acid ester to titanium halide of 1:1 or 1:2 are preferred. Examples are $TiCl_4 \cdot C_6H_5COOC_2H_5$, $TiCl_4 \cdot 2C_6H_5COOC_2H_5$, $TiCl_4 \cdot p\text{-}CH_3OC_6H_5COOC_2H_5$, and $TiCl_3 \cdot C_6H_5COOC_2H_5$.

It is preferred to use mixture of a titanium halide and an addition product of a titanium halide and an aromatic carboxylic acid ester.

Aromatic carboxylic acid esters which may be used in this invention are compounds which contain one or more carboxylic ester groups directly attached to a mono- or polycyclic aromatic ring, the aromatic ring may contain other reaction inert substituents such as alkyl, aryl or halogen. Typical examples of such esters are as follows:

Alkyl benzoates such as methyl benzoate, ethyl benzoate, n-propyl benzoate, dipropyl benzoate, butyl benzoate and hexyl benzoate; cycloalkyl benzoates such as cyclopentyl benzoate and cyclohexyl benzoate; aryl benzoates such as phenyl benzoate and benzoic acid-4-tolyl; hydroxybenzoic acid esters such as methyl salicylate, ethyl slicylate, methyl p-hydroxybenzoate, ethyl p-hydroxybenzoate, phenyl salicylate, cyclohexyl p-hydroxybenzoate, benzyl salicylate and ethyl α-resorcinate; alkoxybenzoic acid esters such as methyl anisate, ethyl anisate, phenyl anisate, benzyl anisate, ethyl o-methoxybenzoate and methyl p-ethoxybenzoate; alkylbenzoic acid esters such as methyl p-toluylate, ethyl p-toluylate, phenyl p-toluylate, ethyl o-toluylate and ethyl m-toluylate; amino group-containing benzoic acid esters such as methyl p-aminobenzoate and ethyl p-aminobenzoate; other benzoic acid esters such as vinyl benzoate, allyl benzoate and benzyl benzoate; and naphthoic acid esters such as methyl naphthoate and ethyl naphthoate.

Specially preferred among these compounds are alkyl esters of benzoic acid, o- or p-toluylic acid or p-anisic acid, and methyl and ethyl esters thereof are most preferred.

Organometallic compounds which may be used in this invention are those of Group I-IV metals of the Periodic Table which are known as one component of a Ziegler catalyst. Organoaluminum and organozinc compounds are specially preferred. Examples of these are organoaluminum compounds represented by the general formulae $R_3Al$, $R_2AlX$, $RAlX_2$, $R_2AlOR$, $RAl(OR)X$ and $R_3Al_2X_3$ wherein R is $C_1$ to $C_{20}$ alkyl or aryl and may be same or different, and X is halogen, and organozinc compounds represented by the general formula $R'_2Zn$ wherein R' is $C_1$ to $C_{20}$ alkyl and may be same or different, such as triethylaluminum, triisobutylaluminum, trihexylaluminum, trihexylaluminum, trioctylaluminum, diethylaluminum chloride, ethylaluminum sesquichloride, diethylzinc, and mixtures thereof.

Addition products of organometallic compounds and aromatic carboxylic acid esters which may be used in this invention are those of the foregoing organometallic compounds and the foregoing aromatic carboxylic acid esters, for example, those with a mol ratio of aromatic carboxylic acid ester to organometallic compound of 1:2 to 2:1 are preferably adopted.

It is preferred to use a mixture of an organometallic compound and an addition product of an organometallic compound and an aromatic carboxylic acid ester.

There is no special limitation on the amount of organometallic compounds to be used in this invention, but usually they may be used in amounts ranging from 0.1 to 1000 mols per mol of titanium halide.

In this invention, in both the cases of using the components [A] and [B] as catalyst and using the components [A], [B] and [C] as catalyst, it is desirable that the total amount of aromatic carboxylic acid esters present in the catalyst system be 0.05 mol or more, preferably 0.05 to 10 mols and most preferably from 0.2 to 10 mol, based on the amount of magnesium (gram-atom) present in the same system.

The olefin polymerizing reaction using the catalyst of this invention is carried out in the same manner as in the conventional olefin polymerizing reaction using a Ziegler catalyst; that is, the reaction is carried out in gas phase in substantially oxygen- and water-free atmosphere and in the presence of an inert solent or with monomer itself as solvent. The polymerization conditions for olefin involve temperatures ranging from 20° to 300° C., preferably from 40° to 180° C., and pressures ranging from atmospheric to 70 kg/cm².G, preferably from 2 to 60 kg/cm².G. Adjustment of the molecular weight can be made to a certain extent by changing polymerization conditions such as polymerization temperature and the molar ratio of catalyst, but the addition of hydrogen into the polymerization system is more effective for the same purpose. Of course, two or more stage polymerization reactions involving different polymerization conditions such as different hydrogen concentrations and polymerization temperatures can be carried out using the catalyst of this invention without any trouble.

The process of this invention can be applied to the polymerization of all olefins that are polymerizable with Ziegler catalysts. For example, it is suitably applied to the homopolymerization of α-olefins such as ethylene, propylene, 1-butene and 4-methylpentene, as well as to random and block copolymerizations of ethylene and propylene, ethylene and 1-butene, and propylene and 1-butene. Furthermore, copolymerization with dienes for the purpose of modification of polyolefins, e.g. ethylene and butadiene, ethylene and 1,4-hexadiene, is also carried out preferably following the process of this invention.

The process of this invention is specially effective for polymerizing or copolymerizing α-olefins of $C_3$ to $C_8$ to produce polymers and high stereoregularity.

DESCRIPTION OF PREFERRED EMBODIMENTS

Working examples of this invention are given below, but it is to be understood that they are for purpose of illustration only and the invention is not limited thereto.

EXAMPLE 1

CATALYST PREPARATION 5.7 g. of magnesium oxide which had been vacuum-dried at 400° C. for 4 hours, 13.0 g. of aluminum trichloride and 1.0 ml of methanol were placed in a stainless steel pot having a content volume of 400 ml and containing 25 stainless steel balls each ½ inch in diameter, and a ball milling was performed for 16 hours at room temperature under a nitrogen atmosphere. Then, 3.4 g. of titanium tetrachloride was added and a ball milling was made again for 16 hours at room temperature under a nitrogen atmosphere. The resulting solid powder contained 39 mg of titanium per gram of the solid.

POLYMERIZATION

A 2 liter stainless steel autoclave equipped with an induction stirrer was purged with nitrogen and 1000 ml of hexane was placed therein, then 2 millimol of triethylaluminum, 0.56 millimol of ethyl benzoate and 80 ml of the solid powder prepared above were added and the temperature was raised to 50° C. with stirring. The system was pressurized to 0.5 kg/cm².G with the vapor pressure of hexane, then propylene was introduced until the total pressure was 7 kg/cm².G while polymerization was started. The polymerization was continued for 1 hour under continued introduction of propylene to maintain the total pressure at 7 kg/cm$^2$.G.

Thereafter, excess propylene was discharged. After cooling, the contents were withdrawn and dried to yield 48 g. of a white polypropylene as the total amount of product including amorphous polymer.

The catalyst activity was 92 g.polypropylene/g.solid.hr.C$_3$H$_6$ pressure, 2370 g.polypropylene/g.Ti.hr.C$_3$H$_6$ pressure. The extraction residue with boiling n-heptane for the polymer including solvent-soluble polymer was 80.1%.

COMPARATIVE EXAMPLE 1

A catalyst was prepared and polymerization carried out in the samd manner as in Example 1 except that no methanol was used. As a result, there was obtained only 1 g. of polypropylene.

COMPARATIVE EXAMPLE 2

A catalyst was prepared and polymerization carried out in the same manner as in Example 1 except that aluminum chloride was not used. No polypropylene was obtained.

EXAMPLE 2

A catalyst was prepared in the same manner as in Example 1 except that 1 ml of n-butanol was used in place of methanol. As a result, there was obtained a solid powder containing 36 mg of titanium per gram of the solid.

Polymerization of propylene was then carried out in the same way as in Example 1 except that 80 mg of the solid powder a prepared above was used, to yield 35 g. of a white polypropylene. The catalyst activity was 67 g.polypropylene/g.solid.hr.C$_3$H$_6$ pressure, 1870 g.polypropylene/g.Ti.hr.C$_3$H$_6$ pressure. The extraction residue with boiling n-heptane for the polymer including solvent-soluble polymer was 83.0%.

EXAMPLE 3

Polymerization was conducted in the same way as in Example 1 with the proviso that 0.56 millimol of ethyl p-anisate was used in place of ethyl benzoate, to yield 41 g. of a white polypropylene. The catalyst activity was 79 g.polypropylene/g.solid.hr.C$_3$H$_6$ pressure, 2020 g.polypropylene/g.Ti.hr.C$_3$H$_6$ pressure. The extraction residue with boiling n-heptane for the polymer including solvent-soluble polymer was 83.0%.

EXAMPLE 4

4.5 g. of magnesium oxide which had been vacuum-dried at 400° C. for 4 hours, 17.3 g. of aluminum trichloride and 2.0 ml of methanol were placed in a stainless steel pot having a content volume of 400 ml and containing 25 stainless steel balls each ½ inch in diameter, and a ball milling was performed for 16 hours at room temperature under a nitrogen atmosphere. The resulting solid powder contained 40 mg of titanium per gram of the solid. Using 80 mg of the solid powder just prepared, polymerization was made in the same manner as in Example 1, to yield 52 g. of a white polypropylene. The catalyst activity was 100 g.polypropylene/g.solid.hr.C$_3$H$_6$ pressure, 2500 g.polypropylene/g.Ti.hr.C$_3$H$_6$ pressure. The extraction residue with boiling n-heptane for the polymer including solvent-soluble polymer was 79%.

EXAMPLE 5

A solid powder was prepared in the same manner as in Example 1 with the proviso that 4.7 g. of an addition product, 1:1 (mol ratio), of titanium tetrachloride and ethyl benzoate was used. The solid powder thus obtained contained 36 mg of titanium per gram of the solid.

Using 80 mg of the solid powder just prepared above, polymerization was carried out for 1 hour, to yield 30 g. of a white polypropylene. The catalyst activity was 58 g.polypropylene/g.solid.hr.C$_3$H$_6$ pressure, 1600 g.polypropylene/g.Ti.hr.C$_3$H$_6$ pressure. The extraction residue with boiling n-heptane for the polymer including solvent-soluble polymer was 88.0%.

EXAMPLE 6

Using 80 mg of the solid powder prepared in Example 1, 1000 ml of n-hexane, 1 millimol of an addition product of 1 mol triethylaluminum and 0.5 mol ethyl benzoate, and 1 millimol of a free triethylaluminum, polymerization of propylene was conducted for 1 hour at 50° C. and at a total pressure of 7 kg/cm$^2$.G, to yield 55 g. of a white polypropylene. The catalyst activity was 106 g. polypropylene/g.solid.hr.C$_3$H$_6$ pressure, 2700 g.polypropylene/g.Ti.hr.C$_3$H$_6$ pressure. The extraction residue with boiling n-heptane for the polymer including solvent-soluble polymer was 78.0%.

EXAMPLE 7

CATALYST PREPARATION 5.9 g. of magnesium oxide which had been vacuum-dried at 400° C. for 4 hours, 12.6 g. of aluminum trichloride and 1.0 ml of methanol were placed in a stainless steel pot having a content volume of 400 ml and containing 25 stainless steel balls each ½ inch in diameter, and ball milling was performed for 16 hours at room temperature under a nitrogen atmosphere. The resulting solid powder was washed with 100 ml of dehydrated benzene, then the liquid phase was separated, followed by drying under reduced pressure, to yield 14.5 g. of a dried solid composition. Thereafter, 14.5 g. of the dried solid composition and 2.7 g. of titanium tetrachloride were subjected to ball milling for 16 hours at room temperature. The resulting solid powder was contained 39 mg of titanium per gram.

POLYMERIZATION

A 2 liter stainless steel autoclave equipped with an induction stirrer was purged with nitrogen and 1000 ml of hexane was placed therein, then 2 millimol of triethylaluminum, 0.56 millimol of ethyl benzoate and 80 mg of the solid powder just prepared above were added and the temperature was raised to 50° C. with stirring. The system was pressurized to 0.5 kg/cm$^2$.G with the vapor pressure of hexane, then propylene was introduced until the total pressure was 7 kg/cm$^2$.G while polymerization was started. The polymerization was continued for 1 hour with continued introduction of propylene to maintain the total pressure at 7 kg/cm$^2$.G. Thereafter, excess propylene was discharged. After cooling, the contents were withdrawn and dried to yield 102 g. of a white polypropylene, which was the total amount of product including amorphous polymer. The catalyst activity was 196 g.polypropylene/g.solid.hr.C$_3$H$_6$ pressure, 5030 g.polypropylene/g.Ti.hr.C$_3$H$_6$ pressure. The extraction residue with boiling n-heptane for the polymer including solvent-soluble polymer was 81.9%.

COMPARATIVE EXAMPLE 3

A catalyst was prepared and polymerization conducted for 1 hour in the same manner as in Example 7 except that no methanol was not used. Only a trace amount of polymer was obtained, and the catalyst activity was very low.

EXAMPLE 8

Polymerization was carried out in the same manner as in Example 7 except that 0.56 millimol of ethyl p-anisate was used in place of ethyl benzoate, to yield 98 g. of a white polypropylene. The catalyst activity was 190 g.polypropylene/g.solid.hr.$C_3H_6$ pressure, 4830 g.polypropylene/g.Ti.hr.$C_3H_6$ pressure. The extraction residue with boiling n-heptane for the polymer including solvent-soluble polymer was 84.0%.

EXAMPLE 9

5.6 g. of magnesium oxide which had been vacuum-dried at 400° C. for 4 hours and 12.7 g. aluminum trichloride were placed in a stainless steel pot having a content volume of 400 ml and containing 25 stainless steel balls each ½ inch in diameter, and a preliminary pulverization was performed for 1 hour at room temperature under a nitrogen atmosphere. Then, 1 ml of methanol was added and the mixture was subjected to a ball milling for 15 hours. The resulting solid powder was washed with 100 ml of dehydrated toluene, then the liquid phase was separated, followed by drying under reduced pressure to give 15.3 g. of a dried solid composition. Thereafter, 15.3 g. of the dried solid composition and 2.8 g. of titanium tetrachloride were subjected to a ball milling for 16 hours at room temperature. The resulting solid powder was contained 40 mg of titanium per gram.

Polymerization of propylene was made in the same way as in Example 7 except that 80 mg of the solid powder just prepared above was used, to yield 110 g. of a white polypropylene. The catalyst activity was 210 g.polypropylene/g.solid.hr.$C_3H_6$ pressure, 5290 g.polypropylene/g.Ti.hr.$C_3H_6$ pressure. The extraction residue with boiling n-heptane for the polymer including solvent-soluble polymer was 80.5%.

EXAMPLE 10

4.3 g. of magnesium oxide which had been vacuum-dried at 400° C. for 4 hours and 17.2 g. of aluminum trichloride were placed in a stainless steel pot having a volume of 400 ml and containing 25 stainless steel balls each ½ inch in diameter, and a preliminary pulverization was performed for 1 hour at room temperature under a nitrogen atmosphere. Then, 2 ml of methanol was added and the mixture was subjected to a ball milling for 15 hours. The resulting solid powder was washed with 100 ml of dehydrated benzene, then the liquid phase was separated, followed by drying under reduced pressure to yield 10.3 g. of a dried solid composition. Thereafter, 10.3 g. of the dried solid composition and 1.8 g. of titanium tetrachloride were subjected to a ball milling for 16 hours at room temperature. The resulting solid powder contained 39 mg of titanium per gram.

Polymerization of propylene was carried out in the same manner as in Example 7 except that 80 mg of the solid powder just prepared above was used, to yield 125 g. of a white polypropylene. The catalyst activity was 240 g.polypropylene/g.solid.hr.$C_3H_6$ pressure, 6000 g.polypropylene/g.Ti.hr.$C_3H_6$ pressure. The extraction residue with boiling n-heptane for the polymer including solvent-soluble polymer was 78.0%.

EXAMPLE 11

A solid component was prepared in the same way as in Example 7 except that 4.7 g. of an addition product, 1:1 (mol ratio), of titanium tetrachloride and ethyl benzoate was used. The resulting solid powder was contained 36 mg of titanium per gram.

Using 80 mg of the solid powder just prepared above, polymerization was made for 1 hour in the same way as in Example 7, to yield 70 g. of a white polypropylene. The catalyst activity was 130 g.polypropylene/g.solid.hr.$C_3H_6$ pressure, 3740 g.polypropylene/g.Ti.hr.$C_3H_6$ pressure. The extraction residue with boiling n-heptane for the polymer including solvent-soluble polymer was 89%.

EXAMPLE 12

Using 80 mg of the solid powder prepared in Example 7, 1,000 ml of n-hexane, 1 millimol of an addition product of 1 mol triethylaluminum and 0.5 mol ethyl benzoate, and 1 millimol of a free triethylaluminum, there was made a polymerization of propylene for 1 hour at 50° C. and at a total pressure of 7 kg/cm².G, to yield 88 g. of a white polypropylene. The catalyst activity was 170 g. polypropylene/g.solid.hr.$C_3H_6$ pressure, 4340 g.polypropylene/g.Ti.hr.$C_3H_6$ pressure. The extraction residue with boiling n-heptane for the polymer including solvent-soluble polymer was 82.5%.

We claim:

1. A process for polymerizing olefins using a catalyst, said catalyst consisting of:
   A: a solid component obtained by contacting (1) a magnesium oxide, (2) an aluminum trihalide selected from the group consisting of aluminum chloride, aluminum bromide and aluminum iodide, (3) monohydroxy alcohol containing only carbon, hydrogen and oxygen atoms represented by the general formula ROH wherein R is a group containing 1 to 20 carbon atoms and (4) a titanium halide and/or an addition product of a titanium halide and an aromatic carboxylic acid ester selected from the group consisting of benzoic acid esters, hydroxybenzoic acid esters, alkoxybenzoic acid esters, alkyl benzoic acid esters, amino benzoic acid esters and naphthoic esters; and
   B: an organometallic compound and/or an addition product of an organometallic compound said organometallic compound being of Group I to IV of the Periodic Table and an aromatic carboxylic acid ester of the group set forth in Section A hereof.

2. A process for polymerizing olefins using a catalyst, said catalyst consisting of:
   A: a solid component obtained by contacting (1) a magnesium oxide, (2) an aluminum trihalide selected from the group consisting of aluminum chloride, aluminum bromide and aluminum iodide, (3) monohydroxy alcohol containing only carbon, hydrogen and oxygen atoms represented by the general formula ROH wherein R is a group containing 1 to 20 carbon atoms and (4) a titanium halide and/or an addition product of a titanium halide and an aromatic carboxylic acid ester selected from the group consisting of benzoic acid esters, hydroxybenzoic acid esters, alkoxybenzoic acid esters, alkyl benzoic acid esters, amino benzoic acid esters and naphthoic esters;

B: an organometallic compound and/or an addition product of an organometallic compound said organometallic compound being of Group I to IV of the Periodic Table and an aromatic carboxylic acid ester; and C: an aromatic carboxylic acid ester of the group set forth in Section A hereof.

3. A process for polymerizing olefins using a catalyst, said catalyst consisting of:

A: a solid component obtained by contacting a solid substance obtained by co-pulverizing (1) a magnesium oxide, (2) an aluminum trihalide selected from the group consisting of aluminum chloride, aluminum bromide and aluminum iodide and (3) a monohydroxy alcohol containing only carbon, hydrogen and oxygen atoms represented by the general formula ROH wherein R is a group containing 1 to 20 carbon atoms, then washing the co-pulverized matter with an inert aromatic liquid and separating the liquid phase, with (4) a titanium halide and/or an addition product of a titanium halide and/or an aromatic carboxylic acid ester selected from the group consisting of benzoic acid esters, hydroxybenzoic acid esters, alkoxybenzoic acid esters, alkyl benzoic acid esters, amino benzoic acid esters and naphthoic esters; and B: an organometallic compound and/or an addition product of an organometallic compound said organometallic compound being of Group I to IV of the Periodic Table and an aromatic carboxylic acid ester of the group set forth in Section A hereof.

4. A process for polymerizing olefins using a catalyst, said catalyst consisting of:

A: a solid component obtained by contacting a solid substance obtained by co-pulverizing (1) magnesium oxide, (2) an aluminum trihalide selected from the group consisting of aluminum chloride, aluminum bromide, and aluminum iodide and (3) monohydroxy alcohol containing only carbon, hydrogen and oxygen atoms represented by the general formula ROH wherein R is a group containing 1 to 20 carbon atoms, then washing the co-pulverized matter with an inert aromatic liquid and separating the liquid phase, with (4) a titanium halide and/or an addition product of titanium halide and/or an addition product of titanium halide and an aromatic carboxylic acid ester selected from the group consisting of benzoic acid esters, hydroxybenzoic acid esters, alkoxybenzoic acid esters, alkyl benzoic acid esters, amino benzoic acid esters and naphthoic esters;

B: an organometallic compound and/or an addition product of an organometallic compound said organometallic compound being of Group I to IV of the Periodic Table and an aromatic carboxylic acid ester of the group set forth in Section A hereof; and C: an aromatic carboxylic acid ester of the group set forth in Section A hereof.

5. The process as defined in any of the preceding claims 1 through 4, in which the total amount of aromatic carboxylic acid esters present in the catalyst system is not smaller than 0.05 mol based on the amount of magnesium (gram-atom) present in the catalyst system.

6. The process as defined in any of the preceding claims 1 through 4, in which said organometallic compound is an organoaluminum compound or an organozinc compound.

7. The process as defined in any of the preceding claims 1 through 4, in which said organometallic compound is used in an amount of 0.1 to 1000 mols per mol of titanium halide.

8. The process as defined in any of the preceding claims 1 through 4, in which said polymerization or copolymerization is carried out in the presence of hydrogen.

9. The process as defined in any of the preceding claims 1 through 4, in which said aluminum trihalide is used in an amount of 0.001 to 10 mols per mol of the magnesium oxide.

10. A process as defined in any of the preceding claims 1 through 4 in which said monohydroxy alcohol is used in an amount of 0.001 to 5 mols per mol of magnesium oxide.

11. The process as defined in any of the preceding claims 1 through 4 in which said hydroxy compound is selected from the group consisting of methanol, ethanol, n-propanol, n-butanol, hexanol, cyclohexanol, 2,6-dimethylhexanol, menthol, benzyl alcohol, penethyl alcohol, cymyl alcohol, phenol, cresol, xylenol, butylphenol, octylphenol, nonylphenol, dibutylphenol, naphthol, and cumylphenol.

12. The process as defined in any of the preceding claims 1 through 4, in which said titanium halide is selected from the group consisting of tetravalent titanium halides and trivalent titanium halides.

13. The process as defined in claim 12, in which said tetravalent titanium compounds are the compounds represented by the general formula $Ti(OR)_nX_{4-n}$ wherein R is an alkyl, aryl or aralkyl group having 1 to 20 carbon atoms, X is halogen and n is a whole number of from 0 to 3.

14. The process as defined in claim 12, in which said trivalent titanium compounds are selected from the group consisting of the compounds obtained by reducing the titanium tetrahalides with hydrogen, aluminum, titanium or organometallic compounds and the compounds obtained by reducing the tetravalent alkoxytitanium halides with organometallic compounds.

15. The process as defined in any of the preceding claims 1 through 4, in which said aromatic carboxylic acid ester is selected from the group consisting of methyl benzoate, ethyl benzoate, n-propyl benzoate, dipropyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinate, metyl anisate, ethyl anisate, pehnyl anisate, benzyl anisate, ethyl o-methoxybenzoate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate and ethyl naphthoate.

16. The process as defined in any of the preceding claims 1 through 4, in which the titanium content of the solid component is in the range of from 0.5 to 10% by weight.

17. The process as defined in any of the preceding claims 1 through 4, in which said olefin is selected from the group consisting of ethylene, propylene, butene-1 and 4-methylpentene.

* * * * *